United States Patent
He et al.

(10) Patent No.: US 11,673,575 B1
(45) Date of Patent: Jun. 13, 2023

(54) REAL TIME ESTIMATION OF CRITICAL VEHICLE PARAMETERS IN AUTONOMOUS SYSTEMS

(71) Applicant: PlusAI, Inc., Cupertino, CA (US)

(72) Inventors: Chaozhe He, Clarence Center, NY (US); Xiaoyu Huang, San Jose, CA (US)

(73) Assignee: PlusAi, Inc., Cupertino, CA (US)

( * ) Notice: Subject to any disclaimer, the term of this patent is extended or adjusted under 35 U.S.C. 154(b) by 0 days.

(21) Appl. No.: 17/844,667

(22) Filed: Jun. 20, 2022

(51) Int. Cl.
B60W 60/00 (2020.01)
B60W 40/00 (2006.01)

(52) U.S. Cl.
CPC .......... *B60W 60/001* (2020.02); *B60W 40/00* (2013.01); *B60W 2556/10* (2020.02)

(58) Field of Classification Search
USPC .......................................... 701/23
See application file for complete search history.

(56) References Cited

U.S. PATENT DOCUMENTS

2016/0229397 A1* 8/2016 Muthukumar ........ B60R 21/013
2021/0192867 A1* 6/2021 Fang ....................... G07C 5/008
2021/0405651 A1* 12/2021 Pan ....................... G05D 1/0274

* cited by examiner

*Primary Examiner* — Tyler D Paige
(74) *Attorney, Agent, or Firm* — Sheppard Mullin Richter & Hampton LLP (57) ABSTRACT

Methods, systems, and non-transitory computer-readable media are configured to perform operations comprising: determining whether a first type of condition associated with an input is satisfied; based at least in part on satisfaction of the first type of condition, generating an estimated value of a parameter associated with operation of a vehicle; and controlling the vehicle based at least in part on the estimated value of the parameter.

20 Claims, 6 Drawing Sheets

Nominal Value $t_1$

Nominal Value   Estimated Value $t_2$

Nominal Value   Estimated Value $t_3$

Nominal Value   Estimated Value $t_4$

Estimated Value

REAL TIME ESTIMATION OF CRITICAL VEHICLE PARAMETERS IN AUTONOMOUS SYSTEMS

FIELD OF THE INVENTION

The present technology relates to autonomous systems. More particularly, the present technology relates to real time vehicle parameter estimation.

BACKGROUND

An autonomous system of a vehicle can plan and execute motion for the vehicle. The planning and execution functions of an autonomous system rely on data about the vehicle and an environment in which the vehicle is traveling. The performance of these functions can depend on such data as the state of the vehicle and the conditions of the environment change.

SUMMARY

Various embodiments of the present technology can include methods, systems, and non-transitory computer readable media configured to perform operations comprising: determining whether a first type of condition associated with an input is satisfied; based at least in part on satisfaction of the first type of condition, generating an estimated value of a parameter associated with operation of a vehicle; and controlling the vehicle based at least in part on the estimated value of the parameter.

In some embodiments, the operations further comprise: determining whether a second type of condition is satisfied; and based at least in part on satisfaction of the second type of condition, reporting the estimated value of the parameter in an autonomous system of the vehicle.

In some embodiments, the operations further comprise: determining whether a second type of condition is satisfied; and based at least in part on non-satisfaction of the second type of condition, reporting a nominal value of the parameter in an autonomous system of the vehicle.

In some embodiments, the second type of condition is associated with convergence of estimated values of the parameter during a selected duration of time.

In some embodiments, the parameter is a vehicle parameter or an environmental parameter.

In some embodiments, the operations further comprise: determining whether the estimated value of the parameter falls within a boundary of values associated with the parameter; and discarding the estimated value of the parameter when the estimated value of the parameter does not fall within the boundary of values.

In some embodiments, the operations further comprise: determining whether a second type of condition is satisfied; and based at least in part on satisfaction of the second type of condition, reporting a value of the parameter based on aggregation of a nominal value of the parameter and the estimated value of the parameter.

In some embodiments, the operations further comprise: determining that a second type of condition is not satisfied within a selected duration of time; and restarting a flow to generate an estimated value of the parameter.

In some embodiments, satisfaction of the first type of condition is indicative of reliability in at least one of the input and the estimated value of the parameter.

In some embodiments, the estimated value of the parameter is generated during a first trip of the vehicle and utilized as a nominal value of the parameter during a second trip of the vehicle.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

An autonomous system of a vehicle, such as a truck, can perform planning and control functions. The planning function can generate optimal, safe navigation routes for planned navigation of the vehicle. The control function can command control of the vehicle so that motion of the vehicle can proceed as planned. Both functions rely on an understanding of the vehicle and an environment in which the vehicle is traveling.

The understanding of a vehicle and an environment in which the vehicle is traveling can be supported by knowledge of relevant parameters. In general, a parameter can relate to an aspect or characteristic of a vehicle or its environment that is relevant to operation of the vehicle. Knowledge of parameter values is critical to the ability of an autonomous system to obtain an understanding of states or conditions of the vehicle and its environment. Utilization of accurate parameter values can allow the autonomous system to achieve important performance targets relating to vehicle operation.

In production, autonomous systems may set parameter values to have constant values. The constant values can be determined from prior testing, estimation, and tuning, or modeling based on specifications provided by equipment suppliers. Due to variation in vehicle configurations, changes in operating conditions, equipment degradation over the lifetime of the vehicle, or other factors, parameter values often change. However, conventional autonomous systems often do not account for such changes in parameter values. Thus, conventional autonomous systems can rely on parameter values that are no longer accurate. When inaccurate parameter values are utilized by a conventional autonomous system, substantial vehicle performance problems can undesirably arise.

The present technology provides improved approaches to estimation of parameter values that overcome disadvantages of conventional techniques. The present technology can apply to any parameter that directly or indirectly involves or impacts operation of a vehicle having an autonomous system. Inputs that can inform or support the estimation of a parameter can be identified. In a main flow associated with generation of an estimated value of a parameter, estimation conditions associated with estimation of the parameter value can be applied to the inputs. When the estimation conditions are satisfied, an estimated value of the parameter can be generated. A convergence condition associated with stability of the estimated values of the parameter for a selected duration of time can be applied. When the estimated values of the parameter do not satisfy the convergence condition, a nominal value of the parameter can be reported in the autonomous system for control and planning functions. When the estimated values of the parameter satisfy the convergence condition, the estimated value of the parameter as converged can be reported for control and planning functions. In addition to control and planning functions, the estimated value of the parameter can be used for diagnostic purposes in relation to the vehicle or its autonomous system. In addition, the present technology can be used to estimate maps that are represented by look-up tables, such as an engine torque line, a fuel map, etc. In some instances, a fusion value of the parameter can be generated based on an aggregation of the nominal value of the parameter and the estimated value of the parameter. When estimated values of the parameter do not satisfy the convergence condition for a selected duration of time, a restart can be initiated. The restart can again initiate the main flow associated with generation of an estimated value of the parameter. These and other inventive features and related advantages of the various embodiments of the present technology are discussed in more detail herein.

Figure 1:
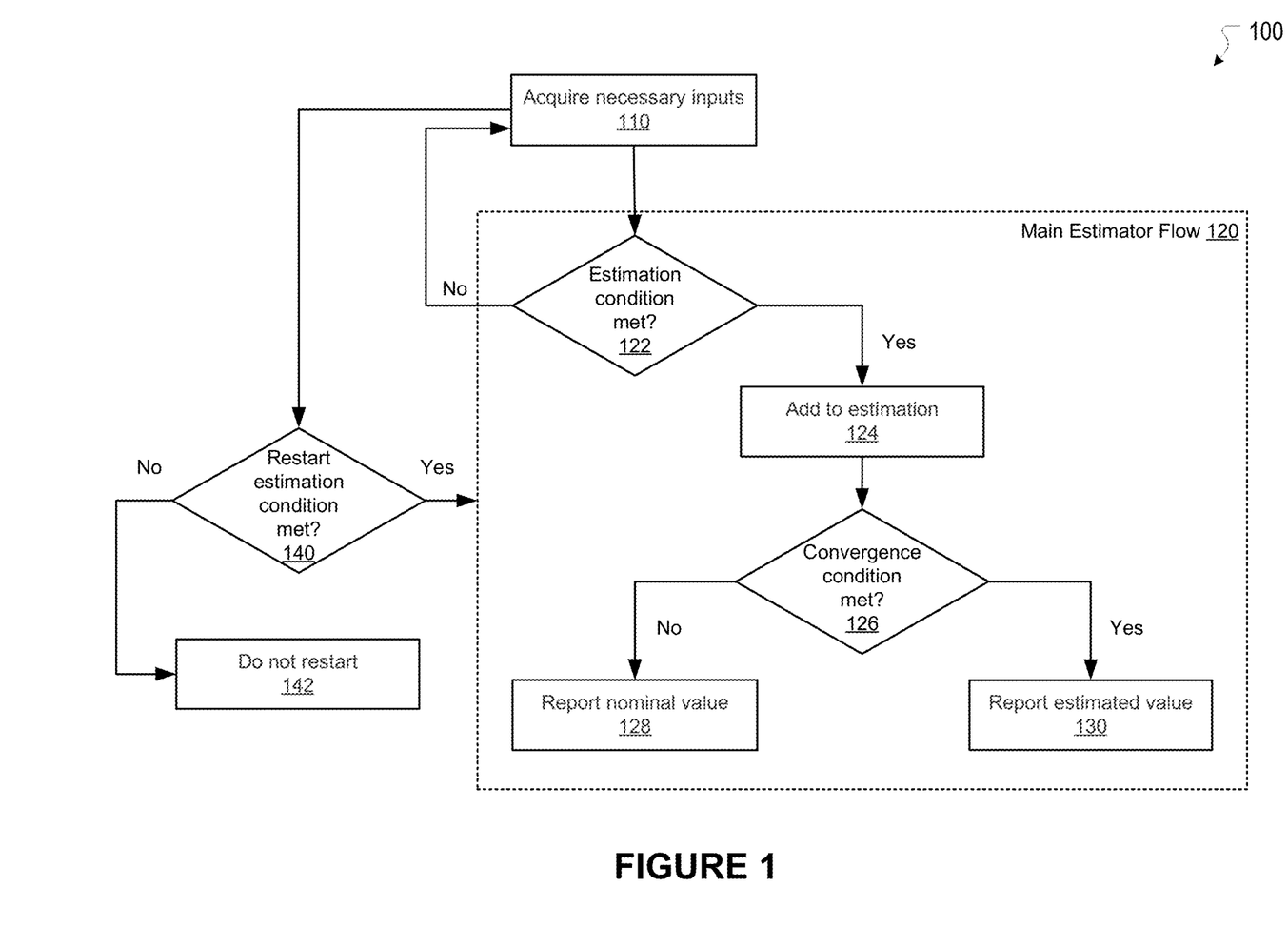
FIG. 1 illustrates an example system flow associated with parameter value estimation, according to embodiments of the present technology.
Figure 5:
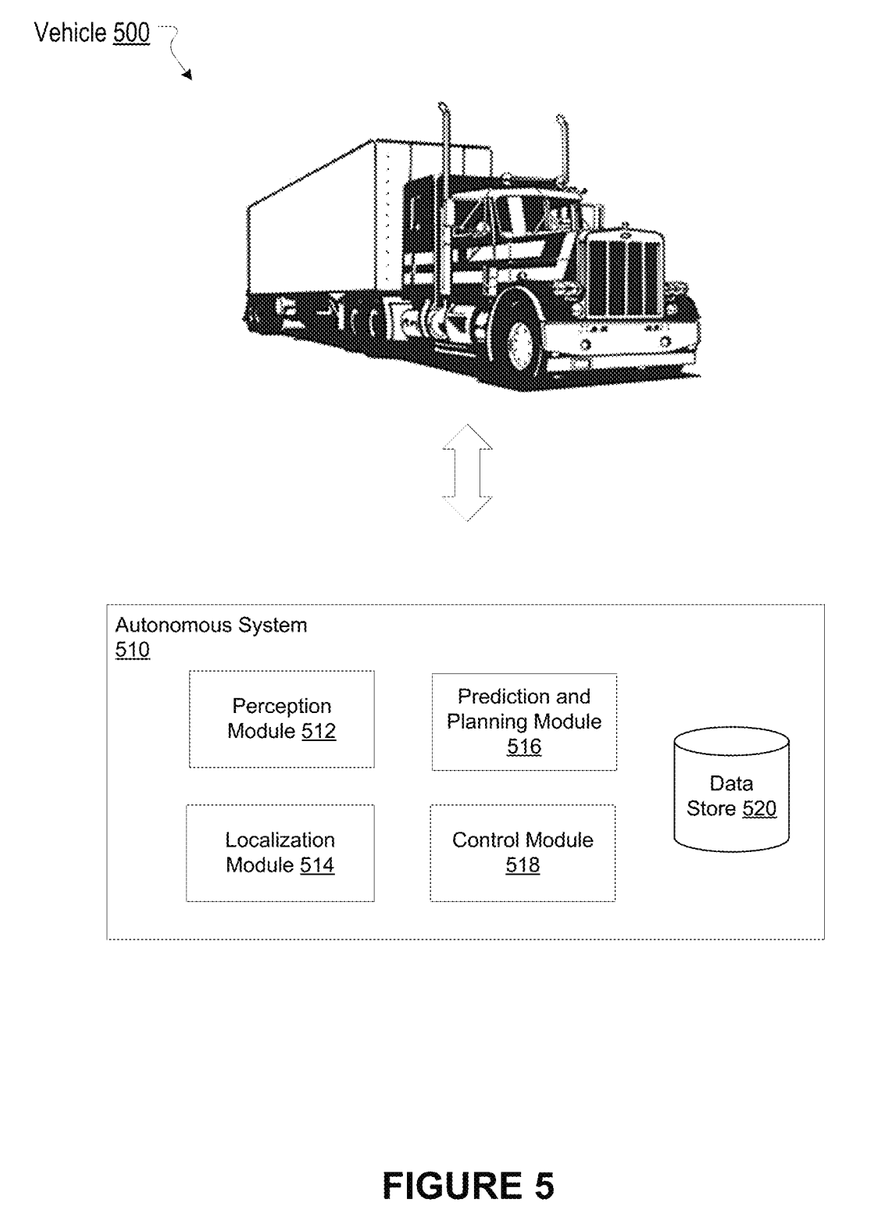
FIG. 5 illustrates an example vehicle, according to embodiments of the present technology.

FIG. 1 illustrates an example system flow 100 to generate in real time an estimated value of a parameter, according to some embodiments of the present technology. In some embodiments, the system flow 100 can be performed by an autonomous system implemented in or by any type of vehicle, such as an autonomous vehicle. In some embodiments, the system flow 100 can be performed in any suitable control module of an autonomous system, such as a control module 518 of an autonomous system 510 as discussed herein. A parameter for which an estimated value is to be generated by the system flow 100 can be any parameter that directly or indirectly concerns a vehicle or an environment in which the vehicle is traveling or is to travel. For example, a parameter can describe or represent some aspect or characteristic of a vehicle or its environment for purposes of planning or executing operation of the vehicle. Utilization by an autonomous system of accurate values of parameters allows the autonomous system to optimally plan and control vehicle operation to realize important vehicle performance objectives.

In some embodiments, some or all of the functionality performed by the system flow 100 may be performed by one or more computing systems implemented in a vehicle. In some embodiments, some or all of the functionality performed by the system flow 100 may be performed by one or more backend computing systems. In some embodiments, some or all of the functionality performed by the system flow 100 may be performed by one or more computing systems associated with (e.g., carried by) one or more users riding in a vehicle. In some embodiments, some or all data processed and/or stored by the system flow 100 can be stored in a data store (e.g., local to the system flow 100) or other storage system (e.g., cloud storage remote from the system flow 100). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the system flow 100 can be implemented in any suitable combinations.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy (such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The system flow 100 describes logic to generate an estimated value of a parameter. The estimated value of the parameter can be reported to or in an autonomous system of a vehicle for optimal vehicle planning and vehicle control. The system flow 100 can include a main estimator flow 120. In block 110, the system flow 100 can acquire one or more inputs that are necessary (or preferred) to generate an estimated value of a parameter. An input can describe any feature or attribute of a vehicle or its environment that is relevant to or supportive of generation of an estimated value of a parameter. The inputs can be periodically acquired during normal operation of the vehicle. For example, inputs such as acceleration, vehicle speed (e.g., MPH), engine speed (e.g., RPM), throttle, and brake can be periodically acquired as a vehicle navigates an environment. The inputs that are acquired can depend on the parameter whose value is to be estimated. For example, a first set of inputs can be required for a first parameter; a second set of inputs can be required for a second parameter; a third set of inputs can be required for a third parameter; and so on. In this example, the first set of inputs, the second set of inputs, and the third set of inputs can be entirely different from one another, can include common inputs, or can be entirely identical to one another. In some embodiments, an estimated value of a first parameter generated in accordance with the present technology can be used as an input in generation of an estimated value of a second parameter in accordance with the present technology.

The system flow 100 can proceed to block 122. At block 122, it can be determined whether the inputs satisfy estimation conditions associated with the parameter whose value is to be estimated. Each parameter can have associated estimation conditions. In some embodiments, parameters can have unique estimation conditions, estimation conditions that are partially identical, or estimation conditions that are wholly identical. The estimation conditions associated with a parameter can be applied to the inputs associated with the parameter. In general, estimation conditions, when satisfied by the inputs, can reflect preferred or required states under which a parameter value is suitably or optimally estimated. For example, estimation conditions when satisfied can confirm the existence or occurrence of a state or condition in which the parameter arises. As another example, estimation conditions when satisfied can help to assure reliability or accuracy in acquired input values or the estimated value of the parameter. The frequency associated with satisfaction of estimation conditions can be based on a frequency at which inputs are acquired. The frequency at which inputs are acquired, in turn, can depend on, for example, a type of the input, operating conditions, and vehicle configurations. For example, the frequency associated with satisfaction of estimation conditions can be the same as or less than the frequency at which inputs are acquired.

When the inputs do not satisfy the estimation conditions, the system flow 100 can proceed to block 110. At block 110, the inputs are again acquired for evaluation of the estimation conditions. When the inputs satisfy the estimation conditions, the system flow 100 can proceed to block 124. At block 124, the inputs can be added, utilized, or considered in generation of an estimated value of the parameter. Generation of an estimated value of a parameter can involve measurement, calculation, or a combination of both, depending on the particular parameter. For example, generation of an estimated value of a first parameter can involve direct measurement of an input using a sensor or gauge. In another example, generation of an estimated value of a second parameter can involve direct measurement of one or more inputs and a calculation based on the measured value of the inputs.

The system flow 100 can proceed to block 126. At block 126, it can be determined whether the estimated values of a parameter, as currently and previously generated, satisfy a convergence condition. In general, a convergence condition when satisfied can indicate that estimated values of a parameter have settled at a value during a selected duration of time. Any suitable convergence technique can be utilized to determine whether the estimated values of the parameter as generated have converged. When the estimated values of the parameter satisfy the convergence condition, the system flow 100 can proceed to block 130. In this regard, as the estimated values of the parameter have converged to a value during the selected duration of time, the converged value can be adopted as the estimated value of the parameter. The frequency associated with satisfaction of a convergence condition can be variable, depending on, for example, the particular parameter whose value is to be estimated as well as operating conditions and vehicle configurations. In some instances, the frequency associated with satisfaction of a convergence condition can be less than (e.g., orders of magnitude less than) the frequency associated with satisfaction of estimation conditions.

At block 130, the estimated value of the parameter as converged can be reported in the autonomous system of the vehicle. For example, the estimated value of the parameter can be provided to a planning function and a control function of the autonomous system to plan and execute vehicle navigation informed by the estimated value of the parameter. As another example, the estimated value of the parameter can be provided to the autonomous system for diagnostic purposes to support maintenance and repair of the vehicle.

In some embodiments, the estimated values of the parameter can be stored. For example, the estimated value of the parameter as converged can be maintained in a data store by the autonomous system. In some embodiments, the estimated value of the parameter can be used as a nominal value during the next operation (e.g., a subsequent trip) of the vehicle and subsequent generation of estimated values of the parameter. In some embodiments, an estimated value of a first parameter can be generated and then later used as an input to generate an estimated value of a second parameter.

When the estimated values of the parameter as generated do not satisfy the convergence condition, the system flow 100 can proceed to block 128. At block 128, a nominal value of the parameter can be reported in the autonomous system. A nominal value of the parameter can be an original or earlier value of the parameter. As just one example, when a parameter relates to a component of a vehicle, a nominal value of the parameter can be a constant value determined through early testing, estimation, and tuning. Alternatively, the nominal value can be a factory setting or a specification provided by a supplier of the component. In this example, a nominal value of the parameter does not reflect the impact on the parameter from changing vehicle conditions or component degradation. As another example, when a parameter relates to an environment in which a vehicle may travel, a nominal value of the parameter can describe an ideal condition or a commonly occurring condition of the environment. In some embodiments, as referenced, a nominal value can be a previously estimated value of the parameter that has been stored by the autonomous system.

From block 110, the system flow 100 can proceed to block 140. At block 140, it can be determined whether a restart estimation condition has been satisfied. A restart estimation condition can be associated with estimated values of a parameter that do not converge within a selected time period. A restart estimation condition when satisfied can indicate a "dead end" where the estimated values of a parameter are unstable, suggesting major changes in the parameter or related operating conditions. When the restart estimation condition is not satisfied, the system flow 140 can proceed to block 142. At block 142, a restart is not attempted. When the restart estimation condition is satisfied, the system flow 100 can proceed to the main estimator flow 120 to begin anew (or restart) another attempt to generate an estimated value of the parameter. In the restart attempt, prior calculations of the estimated values of the parameter can be deemed no longer relevant to generation of an estimated value of the parameter. Accordingly, for example, the prior calculations of the estimated values of the parameter can be discarded and removed from storage.

As discussed, parameters for which estimated values are generated in accordance with the present technology can be any parameters that relate to a vehicle or an environment in which the vehicle is traveling. As one example type of parameter, a vehicle parameter (or intrinsic parameter) can be associated with a state or a condition of some aspect or characteristic of the vehicle itself. As another example type of parameter, an environmental parameter (or extrinsic parameter) can be associated with a state or a condition of some aspect or characteristic of an environment of the vehicle. The system flow 100 can apply to any parameters, such as vehicle parameters and environmental parameters.

As just one illustration of the system flow 100, residue (or residual) brake pressure is one parameter of a large number of possible vehicle parameters whose values can be estimated. Residue brake pressure is the pressure at a braking actuator subsystem when no brake is requested by the autonomous system or a driver. The value of residue brake pressure is important because the value allows a control function of an autonomous system to understand brake actuation performance. Such an understanding enables the control function to maintain precise acceleration tracking that is consistent with planned motion of a vehicle. In addition, residue brake pressure as a parameter can inform the estimation of other parameters, such as parameters relating to vehicle throttle and vehicle coasting behavior. In many normal situations, the initial residue brake pressure value (or nominal value of residue brake pressure) is zero. Due to factors such as manufacturing variation, initial residue brake pressure value can also sometimes be non-zero. In any event, degradation from use of braking actuator subsystems over time and dynamic conditions during vehicle operation can cause changes to initial residue brake pressure values. As a result of these factors that can alter values in residue brake pressure, reliance by the autonomous system on a nominal value of residue brake pressure can be incorrect, resulting in compromised vehicle operation. To address these problems, the system flow 100 can generate in real time accurate estimated values of residue brake pressure.

The parameter of residue brake pressure is associated with inputs against which estimation conditions can be evaluated, as described. The inputs can vary based on the implementation. In some embodiments, the inputs for residue brake pressure can include, for example, a demand and an acceleration. The estimation conditions relating to the demand can relate to neither a driver nor the autonomous system commanding any brake pressure—i.e., the demand is zero. The estimation conditions relating to acceleration can involve an absence of abrupt or significant deceleration. In this regard, deliberate actuation of a braking subsystem through, for example, engagement of an air brake on a truck can be associated with delay. As a result, the estimation conditions relating to acceleration allow for the passing of any delayed, transient brake pressure resulting from prior deliberate engagement of the braking subsystem. While the estimation conditions associated with residue brake pressure are satisfied, estimated values of residue brake pressure can be determined as described herein.

As another illustration of the system flow 100, engine idle speed is another parameter of a large number of possible vehicle parameters whose values can be estimated in real time. Engine idle speed is associated with speed of an engine when no throttle is requested and when motion of the vehicle is due only to powertrain residue throttle. A correct understanding of the value of engine idle speed is important for safe navigation of the vehicle. When no pedal is applied, engine idle speed still can cause forward motion of the vehicle. Although it may be assumed that the vehicle under the absence of pedal will eventually slow to a trivial speed or altogether stop, the vehicle instead can settle at a significant speed based on the engine idle speed. Accordingly, the ongoing motion of the vehicle can potentially cause a collision with an object ahead of the vehicle unless planning and control functions of the autonomous system can account for such motion through a correct estimation of engine idle speed. Inputs associated with engine idle speed can include, for example, a demand. The estimation conditions relating to the demand can relate to neither a driver nor the autonomous system commanding any throttle—i.e., the demand is zero. While the estimation conditions associated with engine idle speed are satisfied, estimations of engine idle speed values can be determined in accordance with the system flow 100 as described.

As yet another illustration of the system flow 100, rolling resistance is another parameter of a large number of possible environmental parameters whose values can be estimated in real time. Rolling resistance is associated with resistive force from the ground that will slow a vehicle. A correct understanding of rolling resistance is important to determine acceleration of the vehicle and thus properly control the vehicle as prescribed by planning and control functions of an autonomous system. A nominal value of rolling resistance can be associated with a variety of factors, such as a road grade (e.g., a substantially flat road), a level of wetness (e.g., substantially dry conditions), and a temperature range (e.g., approximately 20 degrees Celsius). In general, the value of rolling resistance will be relatively smaller under rainy conditions and relatively larger under dry conditions. Accordingly, under rainy conditions as an example, relatively more braking may be required to track acceleration demanded by the autonomous system.

A function of inputs associated with rolling resistance can be calculated to generate an estimated value of the parameter. The inputs associated with rolling resistance can include a multitude of different inputs that can be measured or otherwise acquired. The inputs associated with rolling resistance can include at least, for example, acceleration, vehicle speed, gear condition, throttle, and brake. Estimation conditions can be associated with each input. As an example, acceleration may be associated with an estimation condition that requires a value of acceleration that is a positive value or small negative value (e.g., a value larger than a selected threshold). This estimation condition relating to acceleration is intended to eliminate measurement of acceleration during instances where braking has been commanded. As another example, gear condition may be associated with an estimation condition that requires the vehicle to be in gear, not in gear shift. As yet another example, throttle may be associated with an estimation condition that requires only a modest amount of throttle (e.g., throttle less than a selected threshold) to reduce the possibility of tire slippage in wet road conditions. Other inputs associated with rolling resistance can have their own estimation conditions. The combination of estimation conditions for all applicable inputs for rolling resistance can constitute the estimation conditions to be evaluated in the system flow 100.

The foregoing discussion of the system flow 100 in relation to example parameters is merely illustrative. The system flow 100 in general can apply to any parameters. The system flow 100 can generate estimated values of any parameter based on its associated nominal values, inputs, estimation conditions, estimated values, convergence conditions, and other characteristics.

Figure 2:
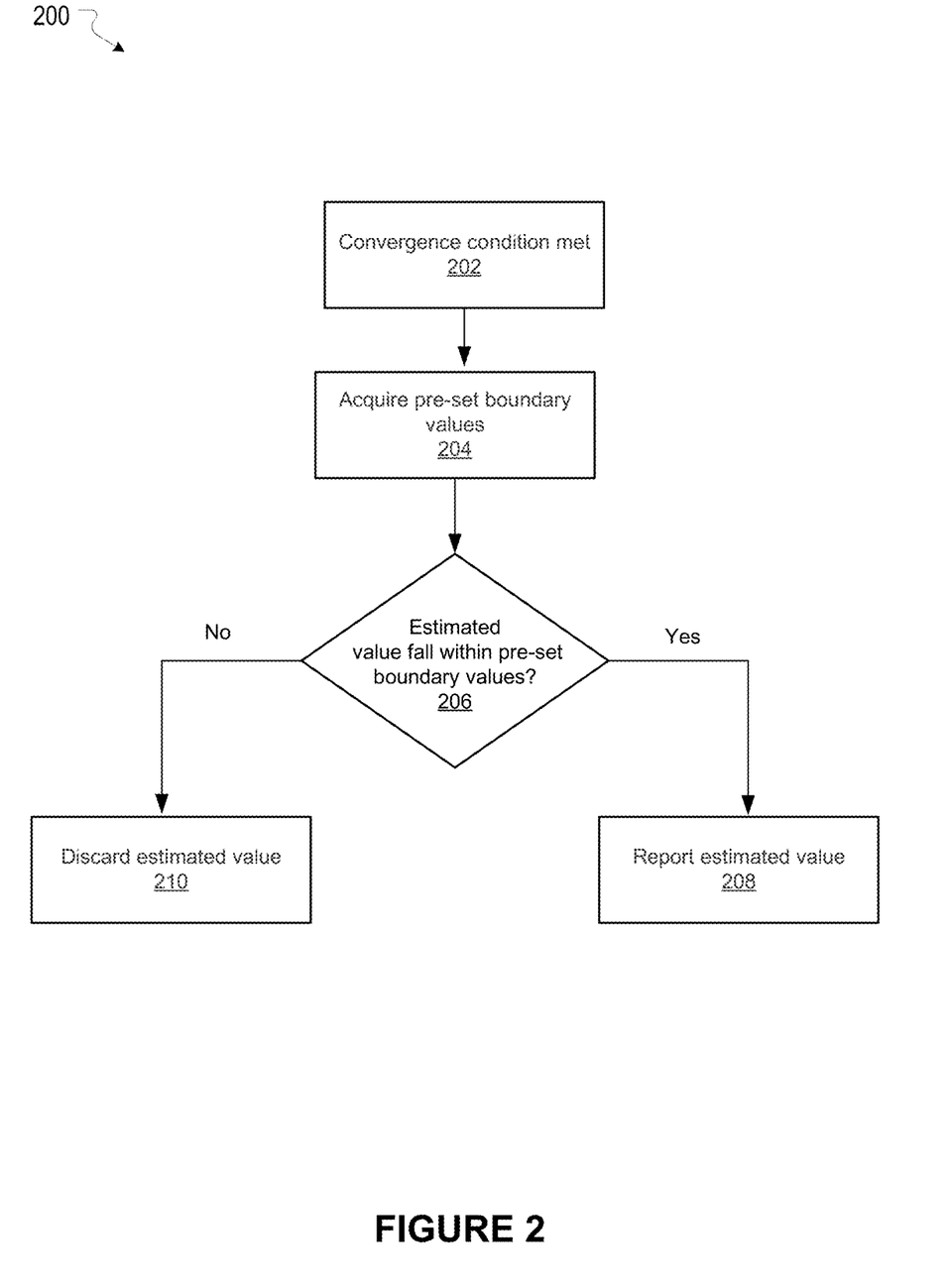
FIG. 2 illustrates an example flow associated with validation of an estimated value of a parameter, according to embodiments of the present technology.

FIG. 2 illustrates an example flow 200 for validation of an estimated value of a parameter in real time, according to some embodiments of the present technology. The flow 200 can compare estimated values of a parameter with expected values of the parameter. In the event of deviation from the expected values, the estimated values of the parameter can be discarded. In block 202, the flow 200 has determined that a convergence condition associated with the parameter is satisfied. In some embodiments, the determination that a convergence condition is satisfied can be based on the system flow 100 in FIG. 1. The flow 200 can proceed to block 204. At block 204, pre-set (or predetermined) boundary values associated with the parameter are acquired. The pre-set boundary values can be a selected range of values for the parameter that are expected, appropriate, or otherwise reasonable. In some embodiments, the pre-set boundary values are configurable depending on a particular implementation.

The pre-set boundary values can vary based on the particular parameter. As just one example, with respect to the parameter of residue brake pressure, pre-set boundary values in one implementation can be a range between a first value in millibars and a second value in millibars. As just another example, with respect to the parameter of engine idle speed, pre-set boundary values in one implementation can be a range between a first value in rpm and a second value in rpm. Again, pre-set boundary values can change for a parameter to suit the requirements or preferences of a given application or context.

The flow 200 can proceed to block 206. At block 206, it can be determined whether an estimated value of the parameter falls within pre-set boundary values. In some embodiments, generation of estimated values of the parameter can be based on the system flow 100. Comparison of the estimated value of the parameter with the pre-set boundary values can indicate whether the estimated value of the parameter is reasonable. If the estimated value of the parameter falls within the pre-set boundary values, then the flow 200 can proceed to block 208. At block 208, the estimated value of the parameter can be reported in the autonomous system for use in planning and control functions to operate the vehicle. If the estimated value of the parameter does not fall within the pre-set boundary values, then the flow 200 can proceed to block 210. At block 210, the estimated value of the parameter can be discarded. Many variations are possible.

Figure 3:
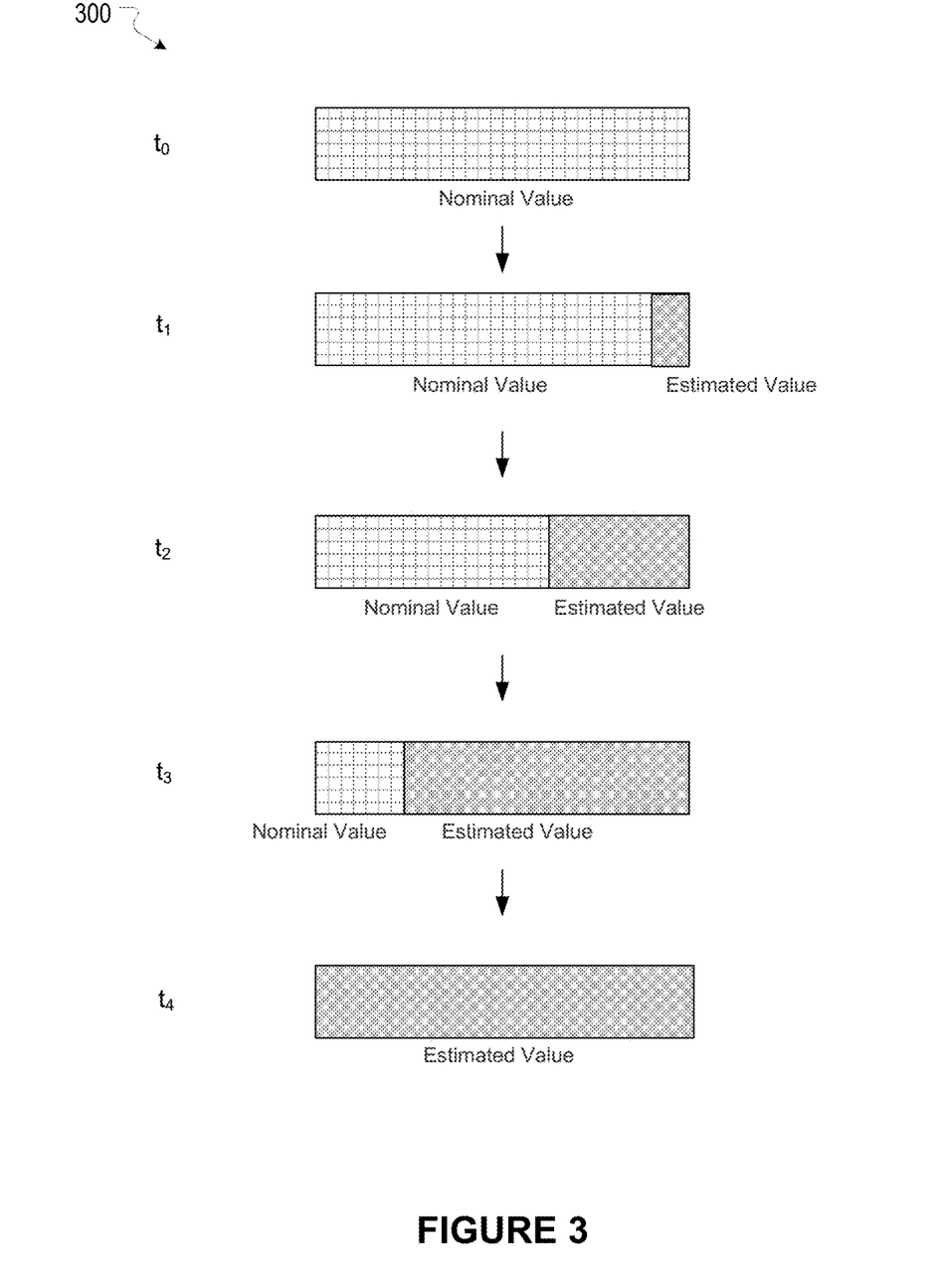
FIG. 3 illustrates an example diagram associated with fusion parameter value estimation, according to embodiments of the present technology.

FIG. 3 is an example diagram 300 that illustrates a fusion technique to generate a value of a parameter in real time, according to some embodiments of the present technology. As discussed, the system flow 100 in FIG. 1 can report a nominal value of a parameter or an estimated value of the parameter. In some embodiments, a fusion technique can be applied to the system flow 100 in relation to the nominal value of the parameter and the estimated value of the parameter. Rather than reporting the nominal values of the parameter or reporting the estimated values of the parameter in accordance with the system flow 100, the fusion technique instead can cause values of the parameter resulting from the fusion technique to be generated and reported. The values of the parameter resulting from the fusion technique can be represented by aggregation of the nominal values of the parameter and the estimated values of the parameter. The values of the parameter resulting from the fusion technique can be reported in an autonomous system of a vehicle for planning purposes, control purposes, diagnostic purposes, etc.

In the fusion technique, a nominal value of a parameter and an estimated value of a parameter can be received. In some embodiments, the fusion technique can receive the nominal value of the parameter and the estimated value of the parameter from the system flow 100 before blocks 128, 130. In the fusion technique, a value of the parameter is reported. The value of the parameter can be based on a varying weighted combination of the nominal value of the parameter and the estimated value of the parameter.

For example, in the fusion technique, when it is determined that a convergence condition associated with the parameter is not satisfied, the value of the parameter can be the nominal value of the parameter. When it is determined that a convergence condition associated with the parameter is satisfied, the value of the parameter can transition over time from the nominal value of the parameter to the estimated value of the parameter. In this regard, the value of the parameter can be initially based on an aggregation of the nominal value of the parameter and the estimated value of the parameter in which the nominal value is more heavily weighted than the estimated value. Thereafter, the value of the parameter can be based on an aggregation of the nominal value of the parameter and the estimated value of the parameter in which the nominal value is increasingly weighted less and the estimated value is increasingly weighted more. After a selected duration of time, the value of the parameter can be based on an aggregation of the nominal value of the parameter and the estimated value of the parameter in which the nominal value is not weighted at all. At this time, the value of the parameter can be the estimated value of the parameter.

In the diagram 300, the values of the parameter, which represent fusion of the nominal values of the parameter and the estimated values of the parameter, as generated by the fusion technique are shown. Time $t_0$ can represent, for example, a time prior to satisfaction of a convergence condition. Accordingly, at time $t_0$, the value of the parameter can be the nominal value alone. At a later time $t_1$, the convergence condition is satisfied. Accordingly, at $t_1$, the value of the parameter is based on a relatively smaller contribution from the nominal value of the parameter and a contribution from the estimated value of the parameter. At later times $t_2$ and $t_3$, the value of the parameter is based on an increasingly smaller contribution from the nominal value of the parameter and an increasingly greater contribution from the estimated value of the parameter. At a later time $t_4$, the value of the parameter can be the estimated value of the parameter alone. The selected duration of time to perform the fusion technique is configurable and can vary based on preferences or requirements of a particular application. The rate at which an estimated value of a parameter increasingly contributes and a nominal value of the parameter decreasingly contributes to a value of a parameter is likewise configurable. Many variations of the fusion technique are possible.

Figure 4:
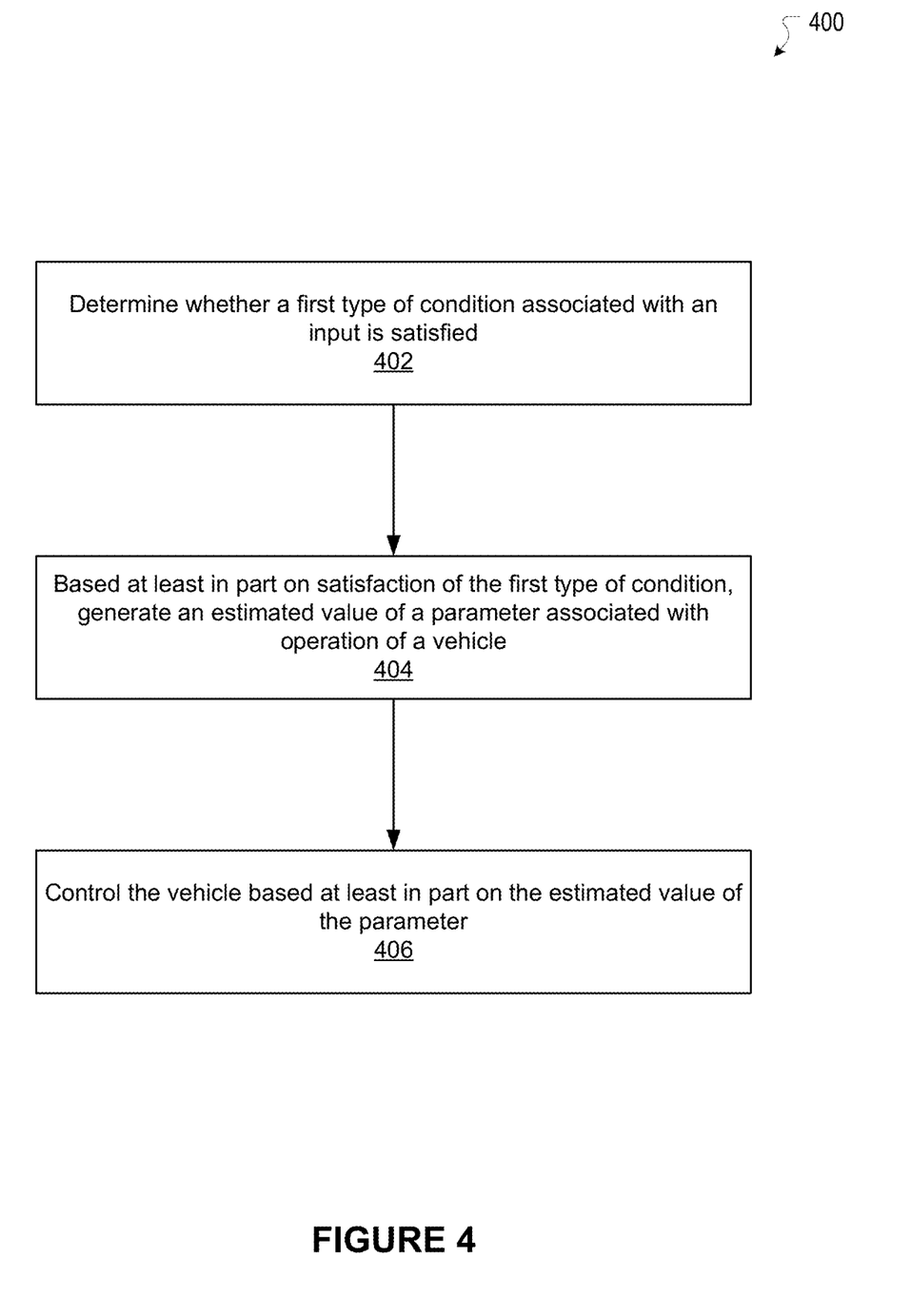
FIG. 4 illustrates an example method associated with parameter value estimation, according to embodiments of the present technology.

FIG. 4 illustrates an example method 400, according to an embodiment of the present technology. The example method 400 can generate in real time estimated values of a parameter. At block 402, the example method 400 can determine whether a first type of condition associated with an input is satisfied. At block 404, the example method 400 can, based at least in part on satisfaction of the first type of condition, generate an estimated value of a parameter associated with operation of a vehicle. At block 406, the example method 400 can control the vehicle based at least in part on the estimated value of the parameter. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

FIG. 5 illustrates a vehicle 500 including an autonomous system 510, according to various embodiments of the present technology. The functionality and operation of the present technology, including the autonomous system 510, can be implemented in whole or in part by the vehicle 500. The present technology can cause desired control and navigation of the vehicle 500, as described herein. In some embodiments, the vehicle 500 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 510 of the vehicle 500 can support and execute various modes of navigation of the vehicle 500. The autonomous system 510 can support and execute an autonomous driving mode, a semi-autonomous driving mode, and a driver assisted driving mode of the vehicle 500. The autonomous system 510 also can enable a manual driving mode. For operation of the vehicle 500, the autonomous system 510 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 510 can include, for example, a perception module 512, a localization module 514, a prediction and planning module 516, and a control module 518. The functionality of the perception module 512, the localization module 514, the prediction and planning module 516, and the control module 518 of the autonomous system 510 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 510 can be implemented in any suitable combinations.

The perception module 512 can receive and analyze various types of data about an environment in which the vehicle 500 is located. Through analysis of the various types of data, the perception module 512 can perceive the environment of the vehicle 500 and provide the vehicle 500 with critical information so that planning of navigation of the vehicle 500 is safe and effective. For example, the perception module 512 can determine the pose, trajectories, size, shape, and type of objects in the environment of the vehicle 500. Various models, such as machine learning models, can be utilized in such determinations.

The various types of data received by the perception module 512 can be any data that is supportive of the functionality and operation of the present technology. For example, the data can be attributes of the vehicle 500, such as location, speed, acceleration, weight, and height of the vehicle 500. As another example, the data can relate to topographical features in the environment of the vehicle 500, such as traffic lights, road signs, lane markers, landmarks, buildings, structures, trees, curbs, bodies of water, etc. As yet another example, the data can be attributes of dynamic objects in the surroundings of the vehicle 500, such as location, speed, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 500 to optimize the collection of data. The data also can be captured by sensors that are not mounted on or in the vehicle 500, such as data captured by another vehicle (e.g., another truck) or by non-vehicular sensors located in the environment of the vehicle 500.

The localization module 514 can determine the pose of the vehicle 500. Pose of the vehicle 500 can be determined in relation to a map of an environment in which the vehicle 500 is traveling. Based on data received by the vehicle 500, the localization module 514 can determine distances and directions of features in the environment of the vehicle 500. The localization module 514 can compare features detected in the data with features in a map (e.g., HD map) to determine the pose of the vehicle 500 in relation to the map. The features in the map can include, for example, traffic lights, crosswalks, road signs, lanes, road connections, stop lines, etc. The localization module 514 can allow the vehicle 500 to determine its location with a high level of precision that supports optimal navigation of the vehicle 500 through the environment.

The prediction and planning module 516 can plan motion of the vehicle 500 from a start location to a destination location. The prediction and planning module 516 can generate a route plan, which reflects high level objectives, such as selection of different roads to travel from the start location to the destination location. The prediction and planning module 516 also can generate a behavioral plan with more local focus. For example, a behavioral plan can relate to various actions, such as changing lanes, merging onto an exit lane, turning left, passing another vehicle, etc. In addition, the prediction and planning module 516 can generate a motion plan for the vehicle 500 that navigates the vehicle 500 in relation to the predicted location and movement of other objects so that collisions are avoided. The prediction and planning module 516 can perform its planning operations subject to certain constraints. The constraints can be, for example, to ensure safety, to minimize costs, and to enhance comfort.

Based on output from the prediction and planning module 516, the control module 518 can generate control signals that can be communicated to different parts of the vehicle 500 to implement planned vehicle movement. The control module 518 can provide control signals as commands to actuator subsystems of the vehicle 500 to generate desired movement. The actuator subsystems can perform various functions of the vehicle 500, such as braking, acceleration, steering, signaling, etc.

The autonomous system 510 can include a data store 520. The data store 520 can be configured to store and maintain information that supports and enables operation of the vehicle 500 and functionality of the autonomous system 510. The information can include, for example, instructions to perform the functionality of the autonomous system 510, data captured by sensors, data received from a remote computing system, parameter values reflecting vehicle states, map data, machine learning models, algorithms, vehicle operation rules and constraints, navigation plans, etc.

The autonomous system 510 of the vehicle 500 can communicate over a communications network with other computing systems to support navigation of the vehicle 500. The communications network can be any suitable network through which data can be transferred between computing systems. Communications over the communications network involving the vehicle 500 can be performed in real time (or near real time) to support navigation of the vehicle 500.

In some embodiments, the autonomous system 510 can communicate with a remote computing system (e.g., server, server farm, peer computing system) over the communications network. The remote computing system can include an autonomous system, and perform some or all of the functionality of the autonomous system 510. In some embodiments, the functionality of the autonomous system 510 can be distributed between the vehicle 500 and the remote computing system to support navigation of the vehicle 500. For example, some functionality of the autonomous system 510 can be performed by the remote computing system and other functionality of the autonomous system 510 can be performed by the vehicle 500. In some embodiments, a fleet of vehicles including the vehicle 500 can communicate data captured by the fleet to a remote computing system controlled by a provider of fleet management services. The remote computing system in turn can aggregate and process the data captured by the fleet. The processed data can be selectively communicated to the fleet, including vehicle 500, to assist in navigation of the fleet as well as the vehicle 500 in particular. In some embodiments, the autonomous system 510 of the vehicle 500 can directly communicate with a remote computing system of another vehicle. For example, data captured by the other vehicle can be provided to the vehicle 500 to support navigation of the vehicle 500, and vice versa. The vehicle 500 and the other vehicle can be owned by the same entity in some instances. In other instances, the vehicle 500 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 6:
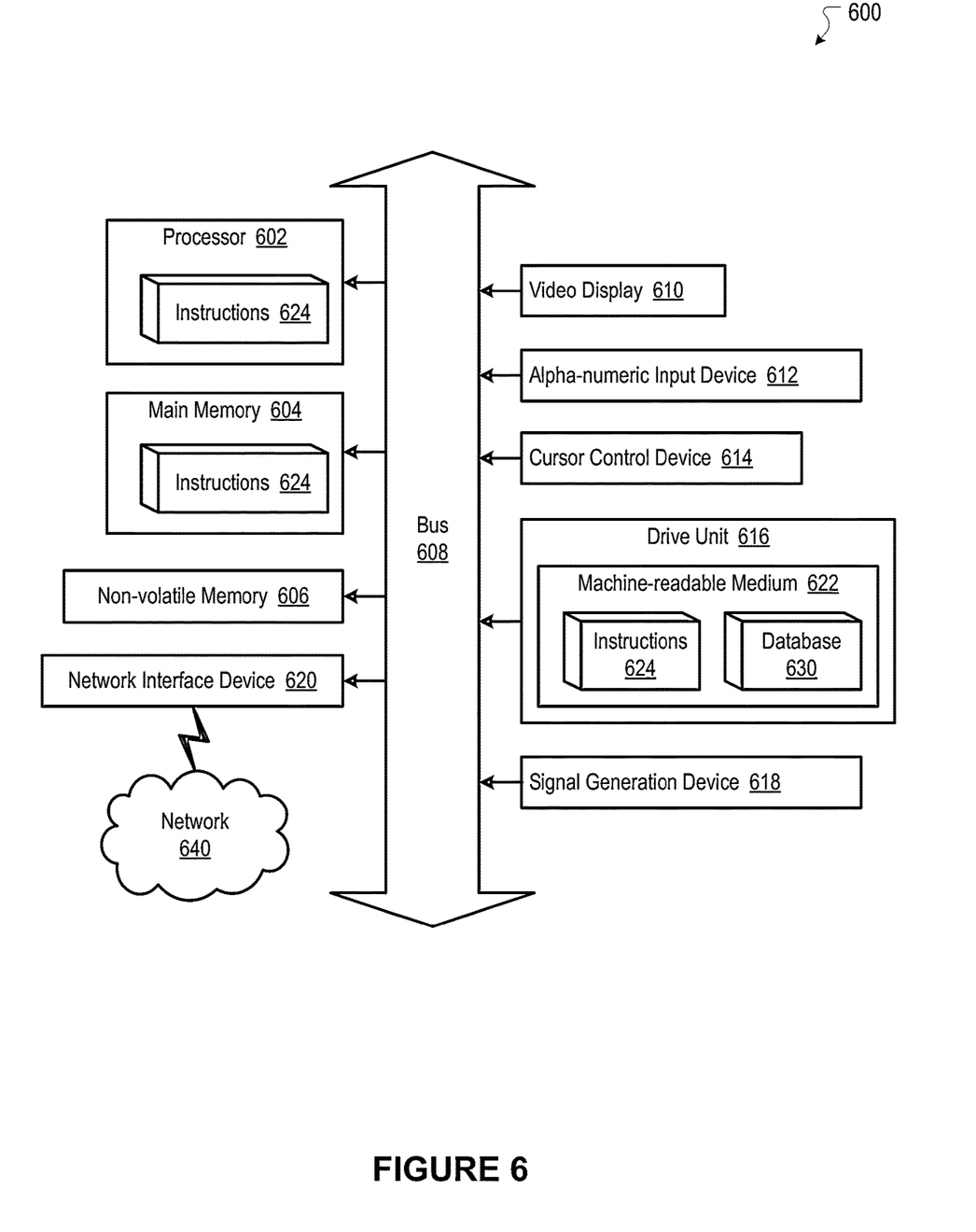
FIG. 6 illustrates an example computing system, according to embodiments of the present technology.

FIG. 6 illustrates an example of a computer system 600 that may be used to implement one or more of the embodiments of the present technology. The computer system 600 can be included in a wide variety of local and remote machine and computer system architectures and in a wide variety of network and computing environments that can implement the functionalities of the present technology. The computer system 600 includes sets of instructions 624 for causing the computer system 600 to perform the processes and features discussed herein. The computer system 600 may be connected (e.g., networked) to other machines and/or computer systems. In a networked deployment, the computer system 600 may operate in the capacity of a server or a client machine in a client-server network environment, or as a peer machine in a peer-to-peer (or distributed) network environment.

The computer system 600 includes a processor 602 (e.g., a central processing unit (CPU), a graphics processing unit (GPU), or both), a main memory 604, and a nonvolatile memory 606 (e.g., volatile RAM and non-volatile RAM, respectively), which communicate with each other via a bus 608. In some embodiments, the computer system 600 can be a desktop computer, a laptop computer, personal digital assistant (PDA), or mobile phone, for example. In one embodiment, the computer system 600 also includes a video display 610, an alphanumeric input device 612 (e.g., a keyboard), a cursor control device 614 (e.g., a mouse), a drive unit 616, a signal generation device 618 (e.g., a speaker) and a network interface device 620.

In one embodiment, the video display 610 includes a touch sensitive screen for user input. In one embodiment, the touch sensitive screen is used instead of a keyboard and mouse. The disk drive unit 616 includes a machine-readable medium 622 on which is stored one or more sets of instructions 624 (e.g., software) embodying any one or more of the methodologies or functions described herein. The instructions 624 can also reside, completely or at least partially, within the main memory 604 and/or within the processor 602 during execution thereof by the computer system 600. The instructions 624 can further be transmitted or received over a network 640 via the network interface device 620. In some embodiments, the machine-readable medium 622 also includes a database 630.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 606 may also be a random access memory. The non-volatile memory 606 can be a local device coupled directly to the rest of the components in the computer system 600. A non-volatile memory that is remote from the system, such as a network storage device coupled to any of the computer systems described herein through a network interface such as a modem or Ethernet interface, can also be used.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   determining, by a computing system, whether a first type of condition associated with an input is satisfied;
   based at least in part on satisfaction of the first type of condition, generating, by the computing system, the estimated value of a parameter associated with operation of a vehicle, wherein the parameter is associated with at least one of engine idle speed associated with the vehicle, residual brake pressure associated with the vehicle, and rolling resistance of a road on which the vehicle is traveling;
   based at least in part on whether a second type of condition is satisfied, reporting, by the computing system, the estimated value of the parameter or a nominal value of the parameter; and
   controlling, by the computing system, navigation of the vehicle based at least in part on the estimated value of the parameter.

2. The computer-implemented method of claim 1, further comprising:
   determining, by the computing system, whether a second type of condition is satisfied; and
   based at least in part on satisfaction of the second type of condition, reporting, by the computing system, the estimated value of the parameter in an autonomous system of the vehicle.

3. The computer-implemented method of claim 2, wherein the second type of condition is associated with convergence of estimated values of the parameter during a selected duration of time.

4. The computer-implemented method of claim 1, further comprising:
   determining, by the computing system, whether a second type of condition is satisfied; and
   based at least in part on non-satisfaction of the second type of condition, reporting, by the computing system, a nominal value of the parameter in an autonomous system of the vehicle.

5. The computer-implemented method of claim 1, further comprising:
   determining, by the computing system, whether the estimated value of the parameter falls within a boundary of values associated with the parameter; and
   discarding, by the computing system, the estimated value of the parameter when the estimated value of the parameter does not fall within the boundary of values.

6. The computer-implemented method of claim 1, further comprising:
   determining, by the computing system, whether a second type of condition is satisfied; and
   based at least in part on satisfaction of the second type of condition, reporting, by the computing system, a value of the parameter based on aggregation of a nominal value of the parameter and the estimated value of the parameter.

7. The computer-implemented method of claim 1, further comprising:
   determining, by the computing system, that a second type of condition is not satisfied within a selected duration of time; and
   restarting, by the computing system, a flow to generate the estimated value of the parameter.

8. The computer-implemented method of claim 1, wherein satisfaction of the first type of condition is indicative of reliability in at least one of the input and the estimated value of the parameter.

9. The computer-implemented method of claim 1, wherein the estimated value of the parameter is generated during a first trip of the vehicle and utilized as a nominal value of the parameter during a second trip of the vehicle.

10. The computer-implemented method of claim 1, wherein the nominal value of the parameter does not reflect the impact from changing conditions on the parameter.

11. The computer-implemented method of claim 1, wherein the nominal value is based on at least one of a factory setting, a specification provided by a supplier, an ideal condition of the environment, or a previous value of the parameter estimated during a prior trip of the vehicle.

12. The computer-implemented method of claim 1, further comprising:
    generating, by the computing system, a value of the parameter representing fusion of the nominal value of the parameter weighted by a first weight and the estimated value of the parameter weighted by a second weight.

13. A system comprising:
    at least one processor; and
    a memory storing instructions that, when executed by the at least one processor, cause the system to perform operations comprising:
    determining whether a first type of condition associated with an input is satisfied;
    based at least in part on satisfaction of the first type of condition, generating the estimated value of a parameter associated with operation of a vehicle, wherein the parameter is associated with at least one of engine idle speed associated with the vehicle, residual brake pressure associated with the vehicle, and rolling resistance of a road on which the vehicle is traveling;
    based at least in part on whether a second type of condition is satisfied, reporting, by the computing system, the estimated value of the parameter or a nominal value of the parameter; and
    controlling navigation of the vehicle based at least in part on the estimated value of the parameter.

14. The system of claim 13, wherein the operations further comprise:
    determining whether a second type of condition is satisfied; and
    based at least in part on satisfaction of the second type of condition, reporting the estimated value of the parameter in an autonomous system of the vehicle.

15. The system of claim 14, wherein the second type of condition is associated with convergence of estimated values of the parameter during a selected duration of time.

16. The system of claim 13, wherein the operations further comprise:
    determining whether a second type of condition is satisfied; and
    based at least in part on non-satisfaction of the second type of condition, reporting a nominal value of the parameter in an autonomous system of the vehicle.

17. A non-transitory computer-readable storage medium including instructions that, when executed by at least one processor of a computing system, cause the computing system to perform operations comprising:

determining whether a first type of condition associated with an input is satisfied;

based at least in part on satisfaction of the first type of condition, generating the estimated value of a parameter associated with operation of a vehicle, wherein the parameter is associated with at least one of engine idle speed associated with the vehicle, residual brake pressure associated with the vehicle, and rolling resistance of a road on which the vehicle is traveling;

based at least in part on whether a second type of condition is satisfied, reporting, by the computing system, the estimated value of the parameter or a nominal value of the parameter; and     controlling navigation of the vehicle based at least in part on the estimated value of the parameter.

18. The non-transitory computer-readable storage medium of claim 17, wherein the operations further comprise:

determining whether a second type of condition is satisfied; and     based at least in part on satisfaction of the second type of condition, reporting the estimated value of the parameter in an autonomous system of the vehicle.

19. The non-transitory computer-readable storage medium of claim 18, wherein the second type of condition is associated with convergence of estimated values of the parameter during a selected duration of time.

20. The non-transitory computer-readable storage medium of claim 17, wherein the operations further comprise:

determining whether a second type of condition is satisfied; and     based at least in part on non-satisfaction of the second type of condition, reporting a nominal value of the parameter in an autonomous system of the vehicle.

\* \* \* \* \*